US006497479B1

(12) United States Patent
Stoffel et al.

(10) Patent No.: US 6,497,479 B1
(45) Date of Patent: Dec. 24, 2002

(54) HIGHER ORGANIC INKS WITH GOOD RELIABILITY AND DRYTIME

(75) Inventors: John L. Stoffel, San Diego, CA (US); Anne M. Kelly-Rowley, San Diego, CA (US); Keshava A. Prasad, San Marcos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/844,867

(22) Filed: Apr. 27, 2001

(51) Int. Cl.$^7$ .................................................. B41J 2/01
(52) U.S. Cl. ........................ 347/100; 347/96; 347/101
(58) Field of Search ................................. 347/105, 100, 347/101, 96; 428/195

(56) References Cited

U.S. PATENT DOCUMENTS

| | | | |
|---|---|---|---|
| 4,500,895 A | 2/1985 | Buck et al. .............. 346/140 R |
| 4,771,295 A | 9/1988 | Baker et al. ................. 346/1.1 |
| 4,944,850 A | 7/1990 | Dion ........................... 204/15 |
| 5,207,824 A | 5/1993 | Moffatt et al. ............. 106/22 R |
| 5,278,584 A | 1/1994 | Keefe et al. ............ 346/140 R |
| 5,354,044 A | 10/1994 | Firl et al. ....................... 271/4 |
| 5,393,151 A | 2/1995 | Martin et al. ............... 400/642 |
| 5,419,644 A | 5/1995 | Martin et al. ............... 400/642 |
| 5,431,724 A | 7/1995 | Adamic et al. ............ 106/22 R |
| 5,454,553 A | 10/1995 | Firl et al. .................. 271/4.04 |
| 5,454,648 A | 10/1995 | Lee ............................. 400/48 |
| 5,549,740 A * | 8/1996 | Takahashi et al. ........... 347/100 |
| 5,618,338 A * | 4/1997 | Kurabayashi et al. ....... 347/100 |
| 5,625,398 A | 4/1997 | Milkovits et al. ........... 347/104 |
| 5,633,662 A | 5/1997 | Allen et al. .................... 347/15 |
| 5,700,315 A | 12/1997 | Wenzel ..................... 106/31.58 |
| 5,746,818 A * | 5/1998 | Yatake ........................ 347/100 |
| 6,056,396 A * | 5/2000 | Wenzel ....................... 347/100 |
| 6,090,749 A | 7/2000 | Kowalski .................... 503/227 |
| 6,281,269 B1 * | 8/2001 | Schut ......................... 347/100 |

OTHER PUBLICATIONS

Hewlett–Packard Journal, vol. 39, No. 4 (Aug. 1988).

* cited by examiner

*Primary Examiner*—John Barlow
*Assistant Examiner*—Manish S. Shah

(57) ABSTRACT

An inkjet ink is provided that has a greater organic content than prior art inks. However, it is not simply enough to increase the organic content; other factors must be considered as well. These include controlling viscosity and surface tension, as well as maintaining acceptable drytime. An inkjet ink composition that evidences reduced outgassing and reduces paper cockle and curl comprises about 25 to 50 wt % of one or more organic co-solvents, has a viscosity of 10 cp or less, and has a surface tension of 40 dyne/cm or less. Advantageously, using a higher solvent ink reduces cockle and curl. Cockle and curl are also reduced as the water content of the ink is reduced. The present invention uses the higher solvent inks in combination with underprinting. In underprinting, a fixer solution is first "printed" on the print medium, followed by printing the inkjet ink thereon. There is a synergism to this combination. Together, weaknesses of both approaches are addressed. The advantages are a longer life pen, due to the reduction of outgassing of the ink, and reduced cockle and curl.

14 Claims, 2 Drawing Sheets

HIGHER ORGANIC INKS WITH GOOD RELIABILITY AND DRYTIME

TECHNICAL FIELD

The present invention relates to inkjet printing, and, more particularly, to reducing outgassing of the ink caused by the die in the pen used in inkjet printing.

BACKGROUND ART

Ink-jet printing is a well-established technology, involving jetting ink either thermally, via use of a heated element that expels bubbles of ink from a firing chamber upon controlled activation, or mechanically, via use of a piezo-electric transducer that expels bubbles of ink from a chamber upon controlled activation.

The composition of the inks employed in ink-jet printing has undergone considerable modification, in an effort to improve properties related to the jetting operation as well as to improve the properties of the printed ink.

Commercially-available inkjet inks have a high water content for printing on plain paper, typically on the order of 70 wt % or more water. These inks generally print well on plain paper. However, high water content ink has the disadvantage of degassing in the pen and inducing a deprime as the pen fills with air. Solutions to the outgassing issue have been found by increasing the non-aqueous solvent in the ink. However, this solution often results in inks with decreased edge acuity and optical density as the inks penetrate and wick into the paper.

One problem of particular concern in thermal printing systems (e.g., thermal inkjet printers) is a condition known as "outgassing". The term "outgassing" basically involves the formation of gas bubbles directly within the ink composition during temperature increases which are normally encountered in thermal printing systems. The gas bubbles are comprised of gaseous materials which were previously dissolved in the ink compositions as discussed below. Typically, ink materials which are delivered using thermal inkjet technology are heated to an average temperature of about 25° to 80° C., depending on the printing system being used, by the die, or substrate, on which the heating resistor is formed. At temperatures within this range, the solubility of any air or other gases dissolved within the ink composition will decrease substantially. This condition (which is especially true in connection with water-based inks designed for plain-paper printing) causes super-saturation of the ink composition with the dissolved gases. In turn, the equilibrium kinetics associated with super-saturation will cause gas bubbles to form in the ink.

Gas bubbles can form in the pen structure, preventing ink from reaching the firing chamber. Consequently, the bubbles choke off the pen, and the pen ceases to jet ink onto a print medium. One can use higher organic inks to deal with outgassing. This approach was described in U.S. Pat. No. 5,700,315, entitled "Anti-Outgassing Ink Composition and Method for Using the Same" and issued to Donald E. Wenzel on Dec. 23, 1997. But there are some negative consequences to the straightforward use of the listed high organic solvents. Increased viscosity of the resulting ink leads to lower reliability, typically in short term decap and the firing frequency response of the pen. It also often leads to print quality defects on plain paper, such as poor edge acuity, strike-through, and increased dry-time.

More recent advances in inkjet printing have used underprinting with an ink or a fifth fluid, also called a fixer. Underprinting immobilizes the colorant, improving edge acuity, strike-through, and dry-time. However, a potential disadvantage of underprinting is increased paper cockle, due to the increased amount of water deposited on the print medium.

Thus, there is a need for an ink that, in combination with a fixer, re-tains high edge acuity and optical density while avoiding outgassing of the ink from a heated die in the pen. Such a combination should also evidence decreased paper cockle and curl.

DISCLOSURE OF INVENTION

In accordance with the present invention, an inkjet ink is provided that has a greater organic content than prior art inks. However, it is not simply enough to increase the organic content; other factors must be considered as well. These include controlling viscosity and surface tension. An inkjet ink composition that evidences reduced outgassing and reduces paper cockle and curl comprises about 20 to 40 wt % of one or more organic co-solvents, has a viscosity of 10 cp or less, and has a surface tension of 40 dyne/cm or less.

Advantageously, using a higher solvent ink reduces cockle. Cockle is also reduced as the water content of the ink is reduced.

The present invention uses higher solvent inks in combination with underprinting. In underprinting, a fixer solution is first "printed" on the print medium, followed by printing the inkjet ink thereon. There is a synergism to this combination. Together, weaknesses of both approaches are addressed. The advantages are a longer life pen and reduced cockle and curl with acceptable print quality. Current embodiments have not used higher solvent content inks in their underprinting solutions.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

All concentrations herein are expressed in weight percentages, unless otherwise indicated. The purity of all components is that employed in normal commercial practice for inkjet inks.

Figure 1:
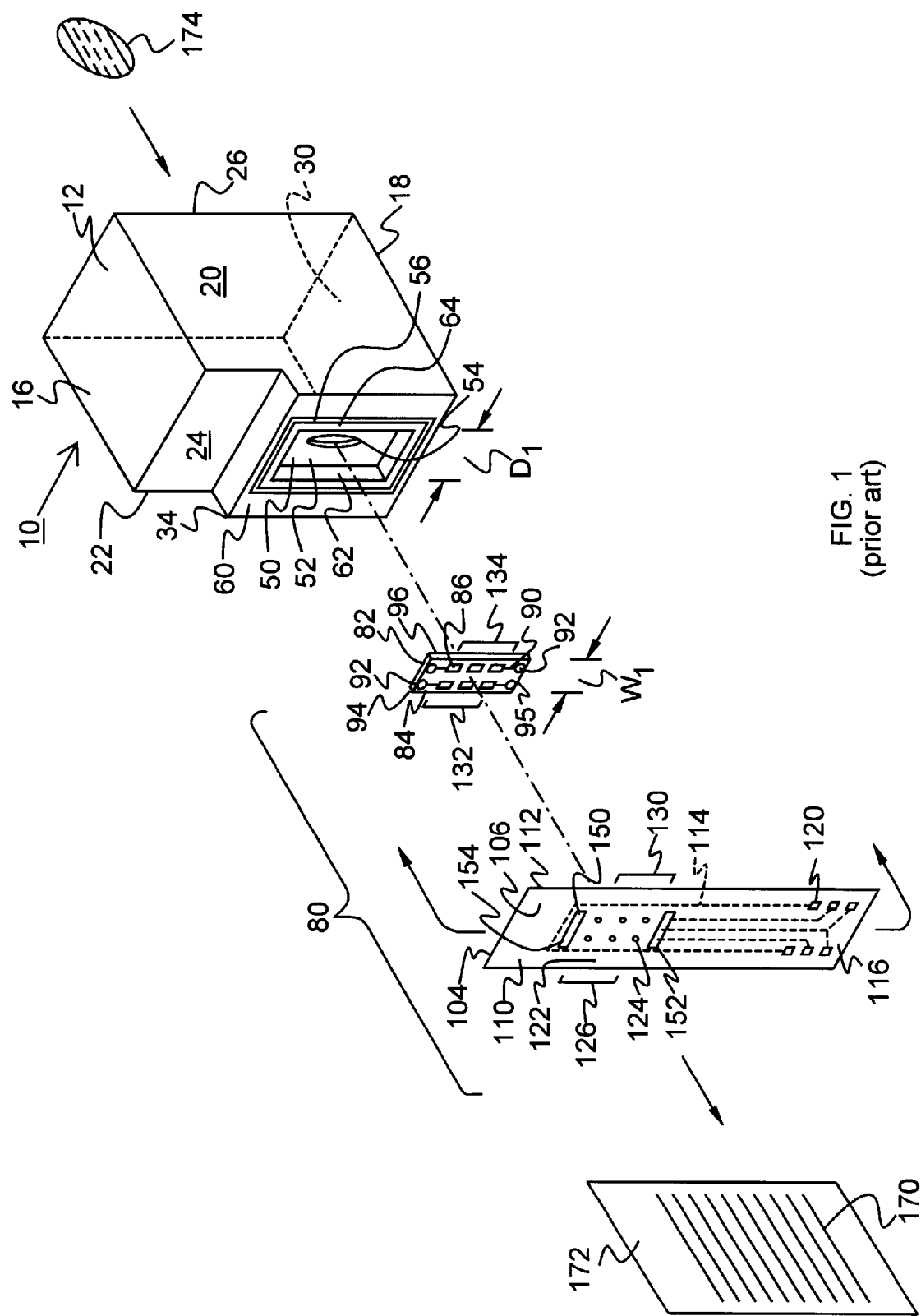
FIG. 1 is a schematic illustration of a representative thermal inkjet cartridge unit, or pen, which is suitable for use in the practice of the present invention.

With reference to FIG. 1, a representative thermal inkjet ink cartridge 10 is illustrated. This cartridge is of a general type shown and described in U.S. Pat. No. 6,090,749 to Kowalski, U.S. Pat. No. 5,278,584 to Keefe et al. and the *Hewlett-Packard Journal*, Vol. 39, No. 4 (August 1988), all of which are incorporated herein by reference. The cartridge 10 is presented in schematic format, with more detailed information involving this product being provided in U.S. Pat. No. 5,278,584. As illustrated in FIG. 1, the cartridge 10 first includes a housing 12 which is preferably manufactured from plastic, metal, or a combination of both. The housing 12 further comprises a top wall 16, a bottom wall 18, a first side wall 20, and a second side wall 22. In the embodiment of FIG. 1, the top wall 16 and the bottom wall 18 are substantially parallel to each other. Likewise, the first side wall 20 and the second side wall 22 are also substantially parallel to each other.

The housing 12 likewise includes a front wall 24 and a rear wall 26. Surrounded by the front wall 24, top wall 16, bottom wall 18, first side wall 20, second side wall 22, and rear wall 26 is an interior chamber or compartment 30 within the housing 12 (shown in phantom lines in FIG. 1) which is designed to retain a supply of ink therein as discussed below. The front wall 24 further includes an externally-positioned, out-wardly-extending printhead support structure 34 which comprises a substantially rectangular central cavity 50 therein. The central cavity 50 includes a bottom wall 52 shown in FIG. 1 with an ink outlet port 54 therein. The ink outlet port 54 passes entirely through the housing 12 and, as a result, communicates with the compartment 30 inside the housing 12 so that ink materials can flow outwardly from the compartment 30 through the ink outlet port 54.

Also positioned within the central cavity 50 is a rectangular, upwardly-extending mounting frame 56, the function of which will be discussed below. As schematically shown in FIG. 1, the mounting frame 56 is substantially even (flush) with the front face 60 of the printhead support structure 34. The mounting frame 56 specifically includes dual, elongate side walls 62, 64 which will likewise be described in greater detail below.

With continued reference to FIG. 1, fixedly secured to housing 12 of the ink cartridge unit 10 (e.g., attached to the outwardly-extending printhead support structure 34) is a printhead generally designated in FIG. 1 at reference number 80. For the purposes of this invention and in accordance with conventional terminology, the printhead 80 actually comprises two main components secured together (with certain sub-components positioned therebetween). These components and additional information concerning the printhead 80 are provided in U.S. Pat. No. 5,278,584 to Keefe et al. which again discusses the ink cartridge 10 in considerable detail and is incorporated herein by reference. The first main component used to produce the printhead 80 consists of a plate-like support member, or die, 82 preferably manufactured from silicon. Secured to the upper surface 84 of the support member 82 using conventional thin film fabrication techniques is a plurality of individually-energizable thin-film resistors 86 which function as "ink ejectors" and are preferably made from a tantalum-aluminum composition known in the art for resistor fabrication. Only a small number of resistors 86 are shown in the schematic representation of FIG. 1, with the resistors 86 being presented in enlarged format for the sake of clarity. Also provided on the upper surface 84 of the support member 82 using conventional photolithographic techniques is a plurality of metallic conductive traces 90 which electrically communicate with the resistors 86. The conductive traces 90 also communicate with multiple metallic pad-like contact regions 92 positioned at the ends 94, 95 of the support member 82 on the upper surface 84. The function of all these components which, in combination, are collectively designated herein as a resistor assembly 96 will be discussed further below. Many different materials and design configurations may be used to construct the resistor assembly 96, with the present invention not being restricted to any particular elements, materials, and components for this purpose. However, in a preferred, representative, and non-limiting embodiment described in U.S. Pat. No. 5,278,584 to Keefe et al., the resistor assembly 96 will be approximately 0.5 inches long, and will likewise contain 300 resistors 86 thus enabling a resolution of 600 dots per inch ("DPI"). The support member 82 containing the resistors 86 thereon will preferably have a width "$W_1$" (FIG. 1) which is less than the distance "$D_1$" between the side walls 62, 64 of the mounting frame 56. As a result, ink flow passageways 100, 102 (schematically shown in FIG. 2) are formed on both sides of the support member 82 so that ink flowing from the ink outlet port 54 in the central cavity 50 can ultimately come in contact with the resistors 86. It should also be noted that the support member 82 may include a number of other components thereon (not shown) depending on the type of ink cartridge unit 10 under consideration. For example, the support member 82 may likewise include a plurality of logic transistors for precisely controlling operation of the resistors 86, as well as a "demultiplexer" of conventional configuration as discussed in U.S. Pat. No. 5,278,584. The demultiplexer is used to demultiplex incoming multiplexed signals and thereafter distribute these signals to the various thin film resistors 86. The use of a demultiplexer for this purpose enables a reduction in the complexity and quantity of the circuitry (e.g., contract regions 92 and traces 90) formed on the support member 82. Other features of the support member 82 (e.g., the resistor assembly 96) will be presented below.

Securely affixed to the upper surface 84 of the support member 82 (with a number of intervening material layers therebetween including a barrier layer and an adhesive layer in the conventional design of FIG. 1) is the second main component of the printhead 80. Specifically, an orifice plate 104 is provided as shown in FIG. 1 which is used to distribute the selected ink compositions to a designated print media material including the substrate of the present invention. Prior orifice plate designs involved a rigid plate structure manufactured from an inert metal composition (e.g., gold-plated nickel) which can also be used in the cartridge 10 of FIG. 1. However, recent developments in thermal inkjet technology have resulted in the use of non-metallic, organic polymer films to construct the orifice plate 104. As illustrated in FIG. 1, this type of orifice plate 104 will consist of a flexible film-type member 106 manufactured from a selected non-metallic organic polymer having a uniform thickness of about 1.0 to 2.0 mils (0.00254 to 0.00508 cm) in a representative embodiment. For the purposes of this invention, the term "non-metallic" shall involve a composition which does not contain any elemental metals, metal alloys, or metal amalgams (e.g., metal mixtures). Likewise, the phrase "organic polymer" shall involve a long-chain carbon-containing structure of repeating chemical subunits. A number of different polymeric compositions may be employed for this purpose, with the present invention not being restricted to any particular construction materials. For example, the orifice plate 104 may be manufactured from the following compositions: polytetrafluoroethylene (e.g., Teflon®), polyimide, polymethylmethacrylate, polycarbonate, polyester, polyamide polyethylene-terephthalate, or mixtures thereof. Likewise, a representative commercial organic polymer (e.g., polyimide-based) composition that is suitable for constructing the orifice plate 104 is a product sold under the trademark "KAPTON" by the DuPont Corporation of Wilmington, Del. (USA). As shown in the schematic illustration of FIG. 1, the flexible orifice plate 104 is designed to "wrap around" the outwardly extending printhead support structure 34 in the completed ink cartridge 10.

Figure 2:
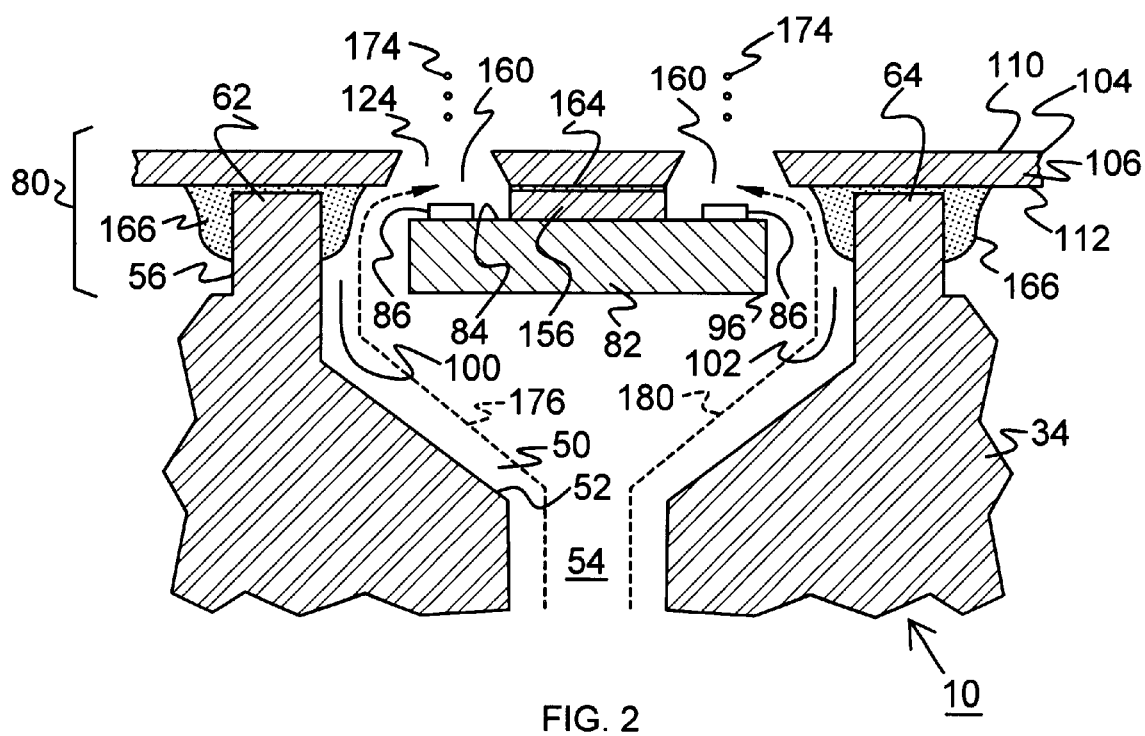
FIG. 2 is a schematic, enlarged cross-sectional view of the printhead associated with the thermal inkjet cartridge unit of FIG. 1.

The film-type member 106 used to produce the orifice plate 104 further includes a top surface 110 and a bottom surface 112 (FIGS. 1 and 2). Formed on the bottom surface 112 of orifice plate 104 and shown in dashed lines in FIG. 1 is a plurality of metallic (e.g., copper) circuit traces 114 which are applied to the bottom surface 112 using known metal deposition and photolithographic techniques. Many different circuit trace patterns may be employed on the bottom surface 112 of the orifice plate 104, with the specific pattern depending on the particular type of ink cartridge unit 10 and printing system under consideration. Also provided at position 116 on the top surface 110 of the orifice plate 104 is a plurality of metallic (e.g. gold-plated copper) contact pads 120. The contact pads 120 communicate with the underlying circuit traces 114 on the bottom surface 112 of the orifice plate 104 using small openings or "vias" (not shown) through the orifice plate 104. During use of the ink cartridge 10 in a printer unit, the pads 120 come in contact with corresponding printer electrodes in order to transmit electrical control signals from the printer unit to the contact pads 120 and circuit traces 114 on the orifice plate 104 for ultimate delivery to the resistor assembly 96. Electrical communication between the resistor assembly 96 and the orifice plate 104 will be discussed below.

Positioned within the middle region 122 of the film-type member 106 used to produce the orifice plate 104 is a plurality of openings or orifices 124 which pass entirely through the orifice plate 104. These orifices 124 are shown in enlarged format in FIG. 1. Each orifice 124 in a representative embodiment will have a diameter of about 0.01 to 0.05 mm. In the completed printhead 80, all of the components listed above are assembled so that each of the orifices 124 is aligned with at least one of the resistors 86 (e.g., "ink ejectors") on the support member 82. As result, energization of a given resistor 86 will cause ink expulsion from the desired orifice 124 through the orifice plate 104. The claimed invention shall not be limited to any particular size, shape, or dimensional characteristics in connection with the orifice plate 104 and shall likewise not be restricted to any number or arrangement of orifices 124. In a representative embodiment as presented in FIG. 1, the orifices 124 are arranged in two rows 126, 130 on the orifice plate 104. If this arrangement of orifices 124 is employed, the resistors 86 on the resistor assembly 96 (e.g., the support member 82) will also be arranged in two corresponding rows 132, 134 so that the rows 132, 134 of resistors 86 are in substantial registry with the rows 126, 130 of orifices 124.

Finally, as shown in FIG. 1, dual rectangular windows 150, 152 are provided at each end of the rows 126, 130 of orifices 124. Partially positioned within the windows 150, 152 are beam-type leads 154 which, in a representative embodiment, are gold-plated copper and constitute the terminal ends (e.g., the ends opposite the contact pads 120) of the circuit traces 114 positioned on the bottom surface 112 of the orifice plate 104. The leads 154 are designed for electrical connection by soldering, thermo-compression bonding, and the like to the contact regions 92 on the upper surface 84 of the support member 82 associated with the resistor assembly 96. Attachment of the leads 154 to the contact regions 92 on the support member 82 is facilitated during mass production manufacturing processes by the windows 150, 152 which enable immediate access to these components. As a result, electrical communication is established from the contact pads 120 to the resistor assembly 96 via the circuit traces 114 on the orifice plate 104. Electrical signals from the printer unit (not shown) can then travel via the conductive traces 90 on the support member 82 to the resistors 86 so that on-demand heating (energization) of the resistors 86 ("ink ejectors") can occur.

At this point, it is important to briefly discuss fabrication techniques in connection with the structures described above which are used to manufacture the printhead 80. Regarding the orifice plate 104, all of the openings therethrough including the windows 150, 152 and the orifices 124 are typically formed using conventional laser ablation techniques as again discussed in U.S. Pat. No. 5,278,584 to Keefe et al. Specifically, a mask structure initially produced using standard lithographic techniques is employed for this purpose. A laser system of conventional design is then chosen which, in a preferred embodiment, involves an excimer laser of a type selected from the following alternatives: $F_2$, ArF, KrCl, KrF, or XeCl. Using this particular system (along with preferred pulse energies of greater than about 100 millijoules/cm$^2$ and pulse durations shorter than about 1 microsecond), the above-listed openings (e.g., orifices 124) can be formed with a high degree of accuracy, precision, and control. However, the claimed invention shall not be limited to any particular fabrication method, with other methods also being suitable for producing the completed orifice plate 104 including conventional ultraviolet ablation processes (e.g., using ultraviolet light in the range of about 150 to 400 nm), as well as standard chemical etching, stamping, reactive ion etching, ion beam milling, and additional known processes.

After the orifice plate 104 is produced as discussed above, the printhead 80 is completed by attaching the resistor assembly 96 (e.g., the support member 82 having the resistors 86 thereon) to the orifice plate 104. In a preferred embodiment, fabrication of the printhead 80 is accomplished using tape automated bonding ("TAB") technology. The use of this particular process to produce the printhead 80 is again discussed in considerable detail in U.S. Pat. No. 5,278,584. Likewise, background information concerning TAB technology is also generally provided in U.S. Pat. No. 4,944,850 to Dion. In a TAB-based fabrication system, the processed film-type member 106 (e.g., the completed orifice plate 104) which has already been ablated and patterned with the circuit traces 114 and contact pads 120 actually exists in the form of multiple, interconnected "frames" on an elongate "tape", with each "frame" representing one orifice plate 104. The tape (not shown) is thereafter positioned (after cleaning in a conventional manner to remove impurities and other residual materials) in a TAB bonding apparatus having an optical alignment subsystem. Such an apparatus is well-known in the art and commercially available from many different sources including but not limited to the Shinkawa Corporation of Japan (model no. IL-20). Within the TAB bonding apparatus, the support member 82 associated with the resistor assembly 96 and the orifice plate 104 are properly oriented so that (1) the orifices 124 are in precise alignment with the resistors 86 on the support member 82; and (2) the beam-type leads 154 associated with the circuit traces 114 on the orifice plate 104 are in alignment with and positioned against the contact regions 92 on the support member 82. The TAB bonding apparatus then uses a "gang-bonding" method (or other similar procedures) to press the leads 154 onto the contact regions 92 (which is accomplished through the open windows 150, 152 in the orifice plate 104). The TAB bonding apparatus thereafter applies heat in accordance with conventional bonding processes to secure these components together. It is also important to note that other standard bonding techniques may likewise be used for this purpose including but not limited to ultrasonic bonding, conductive epoxy bonding, and solid paste application processes. In this regard, the claimed invention shall not be restricted to any particular processing techniques associated with the printhead 80.

As previously noted in connection with the conventional cartridge unit 10 in FIG. 1, additional layers of material are typically present between the orifice plate 104 and resistor assembly 96. These additional layers perform various functions including electrical insulation, adhesion of the orifice plate 104 to the resistor assembly 96, and the like. With reference to FIG. 2, the printhead 80 is illustrated in cross-section after attachment to the housing 12 of the cartridge unit 10. As illustrated in FIG. 2, the upper surface 84 of the support member 82 likewise includes an intermediate barrier layer 156 thereon which covers the conductive traces 90 (FIG. 1), but is positioned between and around the resistors 86 without covering them. As a result, an ink vaporization chamber 160 (FIG. 2) is formed directly above each resistor 86. Within each chamber 160, ink materials are heated, vaporized, and subsequently expelled through the orifices 124 in the orifice plate 104.

The barrier layer 156 (which is traditionally produced from conventional organic polymers, photoresist materials, or similar compositions as outlined in U.S. Pat. No. 5,278,584 to Keefe et al.) is applied to the support member 82 using conventional photolithographic techniques or other methods known in the art for this purpose. In addition to clearly defining the vaporization chambers 160, the barrier layer 156 also functions as a chemical and electrical insulating layer. Positioned on top of the barrier layer as shown in FIG. 2 is an adhesive layer 164 which may involve a number of different compositions including uncured polyisoprene photoresist which is applied using conventional photolithographic and other known methods. It is important to note that the use of a separate adhesive layer 164 may, in fact, not be necessary if the top of the barrier layer 156 can be made adhesive in some manner (e.g. if it consists of a material which, when heated, becomes pliable with adhesive characteristics). However, in accordance with the conventional structures and materials shown in FIGS. 1–2, a separate adhesive layer 164 is employed.

During the TAB bonding process discussed above, the printhead 80 (which includes the previously-described components) is ultimately subjected to heat and pressure within a heating/pressure-exerting station in the TAB bonding apparatus. This step (which may likewise be accomplished using other methods including external heating of the printhead 80) causes thermal adhesion of the internal components together (e.g. using the adhesive layer 164 shown in the embodiment of FIG. 2). As a result, the printhead assembly process is completed at this stage. The only remaining step involves cutting and separating the individual "frames" on the TAB strip (with each "frame" comprising an individual, completed printhead 80), followed by attachment of the printhead 80 to the housing 12 of the ink cartridge unit 10. Attachment of the printhead 80 to the housing 12 may be accomplished in many different ways. However, in a preferred embodiment illustrated schematically in FIG. 2, a portion of adhesive material 166 may be applied to either the mounting frame 56 on the housing 12 and/or selected locations on the bottom surface 112 of the orifice plate 104. The orifice plate 104 is then adhesively affixed to the housing 12 (e.g., on the mounting frame 56 associated with the outwardly-extending printhead support structure 34 shown in FIG. 1). Representative adhesive materials suitable for this purpose include commercially available epoxy resin and cyanoacrylate adhesives known in the art. During the affixation process, the support member 82 associated with the resistor assembly 96 is precisely positioned within the central cavity 50 as illustrated in FIG. 2 so that the support member 82 is located in the center of the mounting frame 56 (discussed above and illustrated in FIG. 1). In this manner, the ink flow passageways 100, 102 (FIG. 2) are formed which enable ink materials to flow from the ink outlet port 54 within the central cavity 50 into the vaporization chambers 160 for expulsion from the cartridge unit 10 through the orifices 124 in the orifice plate 104.

To generate a printed image 170 on a selected image-receiving medium 172 using the cartridge unit 10, a supply of a selected ink composition 174 (schematically illustrated in FIG. 1) which resides within the interior compartment 30 of the housing 12 passes into and through the ink outlet port 54 within the bottom wall 52 of the central cavity 50. The ink composition 174 (which is specially formulated for use in the claimed process as discussed below) thereafter flows into and through the ink flow passageways 100, 102 in the direction of arrows 176, 180 toward the support member 82 having the resistors 86 thereon (e.g. the resistor assembly 96). The ink composition 174 then enters the vaporization chambers 160 directly above the resistors 86. Within the chambers 160, the ink composition 174 comes in contact with the resistors 86. To activate (e.g., energize) the resistors 86, the printer system (not shown) which contains the cartridge unit 10 causes electrical signals to travel from the printer unit to the contact pads 120 on the top surface 110 of the orifice plate 104. The electrical signals then pass through vias (not shown) within the plate 104 and subsequently travel along the circuit traces 114 on the bottom surface 112 of the plate 104 to the resistor assembly 96 containing the resistors 86. In this manner, the resistors 86 can be selectively energized and heated in order to cause ink vaporization and expulsion from the printhead 80 via the orifices 124 through the orifice plate 104. The ink composition 174 can then be delivered in a highly selective, on-demand basis to the image-receiving medium 172 to generate a printed image 170 thereon (FIG. 1).

It is important to emphasize that the printing process discussed above is applicable to a wide variety of different thermal inkjet cartridge designs. In this regard, the inventive concepts presented below shall not be restricted to any particular printing system. However, a representative, non-limiting example of a thermal inkjet cartridge of the type described above which may be used in connection with the claimed invention involves an inkjet cartridge sold by the Hewlett-Packard Company of Palo Alto, Calif. (USA) under the designation "51645A". Other ink cartridge units produced by the Hewlett-Packard Company which are prospectively applicable in the claimed process include products sold under the following designations: 51641A, 51640C, 51640A, 51629A, and 51649A. Examples of additional ink cartridge units include those sold under the designations C4800A, C4801A, C4802A, and C4803A. Likewise, further details concerning thermal inkjet processes in general are discussed in the *Hewlett-Packard Journal*, Vol. 39, No. 4 (August 1988), U.S. Pat. No. 4,500,895 to Buck et al, and U.S. Pat. No. 4,771,295 to Baker et al.

Having described conventional thermal inkjet components and printing methods, the claimed invention and its beneficial features will now be presented.

The firing of the resistors 86 to jet the ink droplets 174 causes the die 82 to heat to an elevated temperature sufficient to cause outgassing of the ink in the passageways 100, 102 along paths 176, 180. The outgassing results from air trapped/dissolved in the ink, and while efforts are made to minimize such trapped/dissolved air, nevertheless, outgassing continues to be a problem to be dealt with in inkjet printing. The outgassing leads to accumulation of air bubbles along the ink flow paths 176, 180, and as can be seen with reference to FIG. 1, there are narrow places that can serve to trap such bubbles. Once the bubbles aggregate sufficiently to block the either of the passageways 100, 102, printing ceases, since the ink flow is not of sufficient force to dislodge the air bubbles.

In accordance with the present invention, an inkjet ink 174 is provided having improved print qualities, including reduced outgassing of the ink caused by the heated die 82. As an additional side benefit, paper cockle and paper curl are also reduced. As described in U.S. Pat. No. 5,207,824, assigned to the same assignee as the present application, paper cockle results from printing inks having a high water content, causing puckering or crinkling of the paper. The phenomenon can interfere with the printing process. This is contrasted with curl, in which the paper turns into a scroll-like tube, sometimes taking days to develop. Curl results from too much liquid being deposited.

Many approaches have been taken with regard to reducing cockle and curl, some of which either involve changing the inkjet ink composition or modifying the paper path. Examples of such patents regarding cockle include the above-mentioned U.S. Pat. No. 5,207,824 (reduction in cockle by reformulating the ink), U.S. Pat. No. 5,431,724 (reduction in cockle by reformulating the ink), U.S. Pat. No. 5,393,151 (reduction in cockle by controlling pen-to-print medium spacing during printing), and U.S. Pat. No. 5,419,644 (reduction in cockle by controlling pen-to-print medium spacing during printing). Examples of such patents regarding curl include U.S. Pat. No. 5,354,044 (reduction in curl by inclining a portion of the output paper tray), U.S. Pat. No. 5,454,553 (reduction in curl by inclining a portion of the output paper tray), U.S. Pat. No. 5,454,648 (reduction in curl by providing a paper guide), and U.S. Pat. No. 5,625,398 (reduction in paper curl by means of an airflow to carry away airborne waste ink), and U.S. Pat. No. 5,633,662 (reduction in curl by controlling ink volume jetted onto the paper).

Apparently, efforts to solve the outgassing problem have not been as extensive; only one patent assigned to the same assignee as the present invention was uncovered, U.S. Pat. No. 5,700,315 (reduction in outgassing by reformulating the ink). That is the same approach as taken herein.

An inkjet ink comprises a vehicle and at least one colorant, as is well-known. The vehicle of the present invention, however, has a higher organic concentration than commonly used in the prior art inkjet ink formulations available commercially. In particular, the organic component of the ink comprises at least 10 wt % of at least one water-miscible co-solvent ("high organic co-solvent") selected from the group consisting of (a)

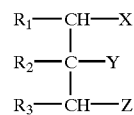

where $R_1$, $R_2$, and $R_3$ are independently H or $CH_3$ and where X, Y, and Z are independently H, OH or $(CH_2)_n OH$, where n=1 to 3; and (b)

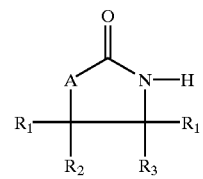

where $A=CH_2$ or NH.

Preferred examples of the former compound include:
ethylhydroxypropanediol (EHPD; trimethylolpropane) ($R_1=R_2=R_3=H$, X=OH, Y=$(CH_2)_2$OH, Z=OH);
3-methyl-1,3,5-pentane-triol (MP triol) ($R_1=CH_3$, $R_2=R_3=H$, X=OH, Y=H, Z=OH);
glycerol ($R_1=R_2=R_3=H$, X=Y=Z=OH); and
1,6-hexanediol ($R_1=R_2=R_3=H$, X=OH, Y=H, Z=$(CH_2)_3$OH.

Preferred examples of the latter compound include:
2-pyrrolidone ($A=CH_2$, $R_1=R_2=H$); and
2-imidazolidone (A=NH, $R_1=R_2=H$).

The total concentration of the organic component is in the range of about 20 to 40 wt %, and preferably about 20 to 35 wt %. The remaining components in the ink, for example, additives such as surfactants, pH modifiers and buffers, viscosity modifiers, chelating agents, and the like remain basically unchanged. Further, the concentration of the colorant remains unchanged.

While benefits of the present invention are realized with the co-solvent concentration as modified herein, the drytime is increased unless compensated for in some way. Accordingly, best results, in terms of cockle and curl reduction, are achieved when the ink is underprinted with a fixer solution to reduce the drytime. The fixer solution typically comprises a vehicle, which may be the same vehicle as the inkjet ink composition, with or without the high organic (outgassing reduction) co-solvents. The inclusion of the outgassing reduction co-solvents has been found to further reduce cockle and curl of the printed media, and does not adversely affect the drytime of the inkjet ink.

In formulating the ink-jet inks and fixers of the present invention, one or more co-solvents are employed in the vehicle. These co-solvents are substantially water-miscible. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, triethylene glycol, tetraethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols. The co-solvent concentration may range from 10 to 25 wt %, with about 10 to 15 wt % being preferred.

To the co-solvent concentration is added one or more of the previously-enumerated high organic co-solvents. It will be seen that the previously-enumerated high organic co-solvents are included in the above definition of co-solvents. However, to take advantage of the teachings herein, one or more of the previously-enumerated high organic co-solvents must be provided in the inkjet ink composition in an amount of 10 to 30 wt %, with the total organic component concentration (co-solvent(s), high organic co-solvent(s), pigment dispersant, and pigment dispersant solvent, to the extent that pigment is used in the inkjet ink) being within the range of about 25 to 40 wt % of the inkjet ink composition.

Any of the pigments and/or dyes commonly used in inkjet printing may be employed in the inkjet inks used herein, and the invention is not limited to the colorant (pigment or dye) used. Such pigments and/or dyes are well-known and available in many published references, both patent and technical literature, and hence are not listed herein. One preferred pigment is carbon black.

The examples below were performed on an experimental printer provided with vacuum. A heated platen could optionally be used.

EXAMPLES

A test of co-solvent concentration was performed, to determine the concentration limits of co-solvents used in the practice of the present invention. The ink in all cases comprised the following basic composition:

5 wt % LEG-1 (a modified short chain ethylene oxide dispersant for the pigment, available from Liponics)
3 wt % glycerol (cosolvent)
7 wt % 2-pyrrolidone (co-solvent).

Colorant examples included a colorant added to the above basic composition:

Ink 1: CAB-O-JET® 200 black colorant aqueous pigment dispersion, available from Cabot Corp. (Billerica, Mass.).

Ink 2: Reactive Black 31 (RB31), a black dye widely available, including Avecia.

Ink 3: Proprietary acrylate-dispersed pigment.

Example inks were formulated with the foregoing basic composition and colorants. In formulating the inks, either 2-pyrrolidone or glycerol was added, over and above the amounts of the basic composition, as follows:

+10 wt % 2-pyrrolidone
+20 wt % 2-pyrrolidone
+10 wt % glycerol
+20 wt % glycerol.

The foregoing inks were printed on five different plain papers:

Champion Data Copy
Gilbert Bond
Hammermill
Papyrus Multicopy
Weyerhauser First Choice.

Example 1

Table I below tabulates the curl for three different inks, wherein "Ink 1" has the formulation listed above, "Ink 1+10% 2P" is Ink 1 plus 10 wt % 2-pyrrolidone, and "Control" is commercially available as HP C4844A black ink. Table I shows that the addition of a minimal amount of only 10 wt % 2-pyrrolidone to a basic ink jet formulation greatly improves the expected pen life ("plot suite" is a measure of pen life, wherein the higher the value, the longer the pen life) and stops curl.

TABLE I

| Example 1 | # of plot suites in characteristic life | Curl |
|---|---|---|
| Ink 1 | 63.8 | Severe |
| Ink 1 + 10% 2-P | 97.6 | None |
| Control | 53.7 | Some |

Example 2

The inks may be underprinted with a fixer. An example of a suitable fixer composition is listed in Table II below.

TABLE II

Composition of Fixer.

| Ink Ingredients | Fixer, wt % |
|---|---|
| 2-pyrrolidone | 4 |
| tetraethylene glycol | 6 |
| 1,5-pentanediol | 10 |
| Tergitol 15-S-5 | 1.25 |
| Bioterge PS-8S | 2.0 |
| Calcium nitrate tetrahydrate | 3.5 |
| Polyethyleneimine (800 MW from Aldrich) | 3.5 |
| pH | 4* |

*adjusted with $HNO_3$

The fixer may also contain the anti-cockle/curl additives of the present invention, but the most effective use of these additives is in the high organic ink itself. The precipitation or immobilization of the colorant is also important to drytime, and the fixer combined with the ink precipitates the colorant to give essentially instantaneous drytime on plain papers. Cockle/curl are a separate issue, which can be helped by the addition of these solvents (the removal of water).

Table III below compares the results of Ink 2 and Ink 2 plus 10 wt % 2-pyrrolidone ("10% 2P"). Specifically, Table III lists the average OD on the five plain papers enumerated above, the average OD with underprinting, the drytime on Champion Data Copy (CDCY), the drytime with underprinting, the bleed on CDCY, the bleed with underprinting, the curl on CDCY with underprinting, the % strike through, and the % strikethrough with underprinting.

Table III shows that underprinting with fixer increases the average OD obtained on a suite of five plain paper media. In addition, the drytime of underprinted ink is instantaneous, even with increased organic level. Bleed is improved with underprinting. The curl of the ink with increased organic content is not particularly good compared to the ink without the increased organic content. However, this is due to the fact that the ink was made with too low a dye load, which required even more liquid than normal on the page to get good OD values. It is expected that with an increased dye load, the curl would be improved with the increased organic content, as seen in Example 3 below.

TABLE III

Comparison of Ink 2 without and with Increased Organic Solvent.

| Example 2 | Ave. OD on Five Plain Papers | Ave. OD with underprinting | Drytime on CDCY | Drytime with underprinting | Bleed on CDCY | Bleed with underprinting | CDCY Curl with underprinting | % strike through | % strike through with underprinting |
|---|---|---|---|---|---|---|---|---|---|
| Ink 2 | 1.21 | 1.28 | 10 sec | 0 sec | Poor | some | 25 mm | 14.8 | 22.9 |
| Ink 2 + 10% 2P | 1.24 | 1.37 | <5 sec | 0 sec | Poor | some | 41 mm | 17.5 | 22 |

Example 3

Table IV below compares the results of Ink 3 alone and with (a) plus 20 wt % 2-pyrrolidone, (b) plus 10 wt % glycerol, and (c) plus 20 wt % glycerol. The same headings as in Table III above are also in Table IV.

Again, underprinting increases the optical density (OD). Increasing the organic content (e.g., +20 wt % glycerol) negatively impacts drytime without underprinting. But with underprinting, drytime is instantaneous in all cases. Underprinting also eliminates bleed even at high total organic content. Curl improves when the high organic content (2-pyrrolidone or glycerol in this example) is added and the fixer eliminates any negative impacts to drytime, bleed, and strikethrough.

The addition of high organic solvents also improves pen life from reduced outgassing as shown in Table I.

TABLE IV

Comparison of Ink 3 without and with Increased Organic Solvent.

| Example 3 | Ave. OD on five plain papers | Ave. OD with underprinting | Drytime on CDCY | Drytime with underprinting | Bleed on CDCY | Bleed with underprinting | CDCY Curl with underprinting | % strike through | % strike through with underprinting |
|---|---|---|---|---|---|---|---|---|---|
| Ink 3 | 1.17 | 1.43 | 10 sec | 0 sec | some | none | 41 mm | 9.7 | 8.6 |
| Ink 3 + 20% 2P | 1.19 | 1.53 | 10 sec | 0 sec | some | non | 33 mm | 11.5 | 7.2 |
| Ink 3 + 10% glycerol | 1.23 | 1.52 | >50 sec | 0 sec | some | none | 13 mm | 9.1 | 7.9 |
| Ink 3 + 20% glycerol | 1.07 | 1.40 | >50 sec | 0 sec | some | none | 7 MM | 12 | 7 |

The foregoing examples have been directed to employing 2-pyrrolidone and glycerol as the high organic co-solvent. Based on addition information, ethylhydroxypropanediol, 3-methyl-1,3,5-pentanetriol, 1,6-hexanediol, and 2-imidazolidone evidence similar beneficial results.

INDUSTRIAL APPLICABILITY

The combination of increased organic co-solvent content, employing at least one of the enumerated co-solvents in the specified concentration range, in both the inkjet ink composition and in the fixer composition is expected to find use in inkjet printing applications.

Thus, there has been disclosed an inkjet ink composition and a fixer composition (for underprinting the inkjet ink) for reducing cockle and curl of print media. It will be readily apparent to those skilled in this art that various changes and modifications of an obvious nature may be made, and all such changes and modifications are considered to fall within the scope of the present invention, as defined by the appended claims.

What is claimed is:

1. In combination, an inkjet ink composition fixed by a fixer composition on a print medium, wherein each composition comprises a vehicle of the same or different composition and, in the case of said inkjet ink composition, additionally comprises at least one colorant, wherein said vehicle comprises at least one water-miscible organic co-solvent and water, wherein at least said inkjet ink composition contains from about 20 to 40 wt % of organic co-solvents, including at least one "high organic" co-solvent selected from the group consisting of (a)

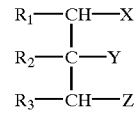

where $R_1$, $R_2$, and $R_3$ are independently H or $CH_3$ and where X, Y, and Z are independently H, OH or $(CH_2)_n OH$, where n=1 to 3; and (b)

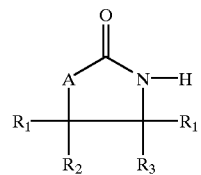

where $A = CH_2$ or NH, said high organic co-solvent being present in an amount of at least 10 wt %.

2. The combination of claim 1 wherein said high organic co-solvent is selected from the group consisting of ethylhydroxypropanediol, 3-methyl-1,3,5-pentanetriol, glycerol, 1,6-hexanediol, 2-pyrrolidone, and 2-imidazolidone.

3. The combination of claim 1 wherein said at least one high organic co-solvent is present in a range of about 20 to 35 wt %.

4. The combination of claim 1 wherein said fixer composition comprises at least one high organic co-solvent.

5. The combination of claim 1 wherein said fixer composition comprises at least one co-solvent and at least one said high organic co-solvent, present in said amount of at least 10 wt %.

6. The combination of claim 1 wherein said at least one colorant is carbon black.

7. A method for reducing die outgassing of a pen used in printing ink on a print medium printed in an inkjet printer, said method comprising:
  (1) providing a fixer composition for printing on said print media in said printer, said fixer composition containing from about 10 to 40 wt % of organic co-solvents;
  (2) printing said fixer composition on said print media where printing is desired;
  (3) providing an inkjet ink composition for printing on said print media in said printer, said inkjet ink composition containing from about 20 to 40 wt % of at least one co-solvent, wherein said at least one co-solvent includes at least one member independently selected from the group consisting of
    (a)

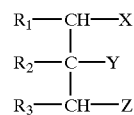

where $R_1$, $R_2$, and $R_3$ are independently H or $CH_3$ and where X, Y, and Z are independently H, OH or $(CH_2)_n OH$, where n=1 to 3; and
    (b)

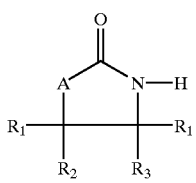

where A=$CH_2$ or NH,
    said high organic co-solvent being present in an amount of at least 10 wt %; and
  (4) printing said inkjet ink on said print media on top of said fixer composition.

8. The method of claim 7 wherein said high organic co-solvent is selected from the group consisting of ethylhydroxypropanediol, 3-methyl-1,3,5-pentanetriol, glycerol, 1,6-hexanediol, 2-pyrrolidone, and 2-imidazolidone.

9. The method of claim 7 wherein said at least one co-solvent is present in a range of about 20 to 35 wt %.

10. The method of claim 7 wherein said fixer composition comprises at least one co-solvent.

11. The method of claim 7 wherein said fixer composition comprises at least one co-solvent and at least one outgassing reduction co-solvent selected from the group consisting of
  (a)

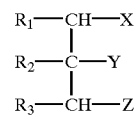

where $R_1$, $R_2$, and $R_3$ are independently H or $CH_3$ and where X, Y, and Z are independently H, OH or $(CH_2)_n OH$, where n =1 to 3; and
  (b)

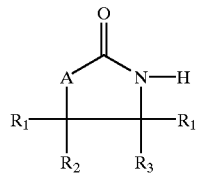

where A=$CH_2$ or NH,
    said high organic co-solvent being present in an amount of at least 10 wt %.

12. The method of claim 11 wherein said high organic co-solvent is selected from the group consisting of ethylhydroxypropanediol, 3-methyl-1,3,5-pentanetriol, glycerol, 1,6-hexanediol, 2-pyrrolidone, and 2-imidazolidone.

13. The method of claim 7 wherein said print medium is optionally heated, either during printing or subsequent thereto, to drive off co-solvent.

14. The method of claim 7 wherein said at least one colorant is carbon black.

* * * * *

UNITED STATES PATENT AND TRADEMARK OFFICE
CERTIFICATE OF CORRECTION

PATENT NO.     : 6,497,479 B1                                       Page 1 of 1
DATED          : December 24, 2002
INVENTOR(S)    : Stoffel et al.

It is certified that error appears in the above-identified patent and that said Letters Patent is hereby corrected as shown below:

Column 10,
Line 9, delete "$R_3$" in the structure and insert therefor -- $R_2$ --.

Column 14,
Line 51, delete "$R_3$" in the structure and insert therefor -- $R_2$ --.

Column 15,
Line 39, delete "$R_3$" in the structure and insert therefor -- $R_2$ --.

Column 16,
Line 30, delete "$R_3$" in the structure and insert therefor -- $R_2$ --.

Signed and Sealed this

Twenty-seventh Day of January, 2004

JON W. DUDAS
*Acting Director of the United States Patent and Trademark Office*